(12) United States Patent
Penda et al.

(10) Patent No.: US 7,596,954 B2
(45) Date of Patent: Oct. 6, 2009

(54) BLADE CLEARANCE CONTROL

(75) Inventors: Allan R. Penda, Amston, CT (US);
Joseph C. Burge, Jupiter, FL (US)

(73) Assignee: United Technologies Corporation, Hartford, CT (US)

( * ) Notice: Subject to any disclaimer, the term of this patent is extended or adjusted under 35 U.S.C. 154(b) by 174 days.

(21) Appl. No.: 10/887,587

(22) Filed: Jul. 9, 2004

(65) Prior Publication Data
US 2006/0005529 A1    Jan. 12, 2006

(51) Int. Cl.
*F02C 6/08*    (2006.01)
(52) U.S. Cl. ................ 60/782; 415/173.2
(58) Field of Classification Search ........... 60/226.1, 60/782; 415/173.2, 174.1, 173.1, 173.3
See application file for complete search history.

(56) References Cited

U.S. PATENT DOCUMENTS

| | | | |
|---|---|---|---|
| 3,326,523 A | | 6/1967 | Bobo |
| 3,529,906 A | | 9/1970 | McLaurin et al. |
| 3,583,824 A | * | 6/1971 | Smuland et al. ............ 415/117 |
| 3,759,038 A | * | 9/1973 | Scalzo et al. ................. 60/800 |
| 4,014,627 A | | 3/1977 | Heurteux |
| 4,118,276 A | * | 10/1978 | Hodzic et al. ............... 376/393 |
| 4,247,247 A | | 1/1981 | Thebert |
| 4,472,108 A | * | 9/1984 | Pask ........................... 415/113 |
| 4,683,716 A | | 8/1987 | Wright et al. |
| 4,844,688 A | | 7/1989 | Clough et al. |
| 4,928,240 A | | 5/1990 | Davison et al. |
| 4,953,282 A | | 9/1990 | Corsmeier et al. |
| 5,104,287 A | | 4/1992 | Ciokajlo |
| 5,134,844 A | * | 8/1992 | Lee et al. ..................... 60/806 |
| 5,181,308 A | | 1/1993 | Gray et al. |
| 5,188,507 A | | 2/1993 | Sweeney |
| 5,203,673 A | | 4/1993 | Evans |
| 5,211,534 A | | 5/1993 | Catlow |
| 5,224,824 A | * | 7/1993 | Eng ........................ 415/209.2 |
| 5,344,284 A | | 9/1994 | Delvaux et al. |
| 5,871,333 A | * | 2/1999 | Halsey ..................... 415/173.1 |
| 7,448,849 B1 | * | 11/2008 | Webster et al. ........... 415/173.1 |
| 2003/0033815 A1 | * | 2/2003 | Proctor et al. ................. 60/782 |
| 2004/0219011 A1 | | 11/2004 | Albers et al. |

FOREIGN PATENT DOCUMENTS

DE    3226052 A1    2/1983

(Continued)

OTHER PUBLICATIONS

British Search Report for GB Patent Application No. 0513290.7 for claims 16-18.

(Continued)

*Primary Examiner*—Michael Cuff
*Assistant Examiner*—Andrew Nguyen
(74) *Attorney, Agent, or Firm*—Bachman & LaPointe, P.C.

(57) ABSTRACT

A turbine engine has a circumferentially segmented shroud within a case structure. Each shroud segment is mounted for movement between an inboard position and an outboard position. One or more springs bias the shroud segments toward their inboard positions. One or more valves are positioned to vent one or more volumes so as to counter the spring bias to shift the shroud segments to their outboard positions.

28 Claims, 9 Drawing Sheets

FOREIGN PATENT DOCUMENTS

| | | |
|---|---|---|
| GB | 1020900 | 2/1966 |
| GB | 1082634 | 9/1967 |
| GB | 2063374 A | 6/1981 |
| JP | 59-113210 A | 6/1984 |
| JP | 63-182368 U | 11/1988 |
| WO | 9607018 A1 | 3/1996 |

OTHER PUBLICATIONS

British Search Report for GB Patent Application 0513290.7 for claims 24 and 25.
United Kingdom Examination Report for GB0513290.7, dated Jan. 21, 2009.
German Office Action for DE102005032068.6, dated Nov. 19, 2008.

* cited by examiner

BLADE CLEARANCE CONTROL

BACKGROUND OF THE INVENTION

The invention relates to gas turbine engines. More particularly, the invention relates to control of blade/shroud interference.

During the operation of a gas turbine engine, there may be various combinations of thermally- and dynamically-induced dimensional changes. One area of particular concern is changes influencing the clearance between compressor blade tips and the adjacent surface of a shroud surrounding the blades. Uncontrolled interference may be catastrophic. Providing sufficient baseline clearance to avoid interference under all anticipated circumstances, however, leaves too large a clearance under other circumstances. The large clearance may result in inefficient operation. The use of rub strips and abradable blade tips may be but a half measure, sacrificially avoiding catastrophic damage upon interference.

A number of systems have been proposed for dynamically accommodating differential expansion. U.S. Pat. No. 4,683,716 identifies a particular segmented shroud compressed radially inward by high pressure air during cruise conditions and expanded by exposure to relatively low pressure air during transients. U.S. Pat. No. 4,844,688 discloses another particular configuration in which high pressure compressed air may be controllably introduced to a chamber to radially position shroud segments. U.S. Pat. No. 5,211,534 discloses another particular configuration in which pressure is applied and released to a pressure tube to radially shift shroud segments. Nevertheless, there remains room for improvement in the art.

SUMMARY OF THE INVENTION

Accordingly, one aspect of the invention involves a turbine engine having a circumferentially segmented shroud within a case structure. Each segment has an inboard surface portion and is mounted for movement between an inboard position and an outboard position. Each blade of a stage of circumferentially arrayed blades has an airfoil with an outboard tip in facing proximity to the shroud. One or more springs bias the shroud segments toward their inboard positions. One or more valves are positioned to vent one or more volumes so as to counter the bias to shift the shroud segments to their outboard positions.

In various implementations, each vane of a stage of circumferentially arrayed vanes may have an airfoil having an outboard portion secured to an associated one of the segments. There may be a bleed duct in at least one of the shroud segments. There may be a number of seals, each between an associated pair of the segments. Each of a group of the segments may have at least an associated first spring of the one or more springs engaged to an outboard surface portion of the segment. For each of that group, the first spring may consist essentially of sheet metal. For a given ring of the segments, an associated group of the one or more springs may at least partially enclose an associated volume of the one or more volumes. A control system may be coupled to the one or more valves and may be programmed to open the one or more valves during a rapid reacceleration, also known as a reburst condition. The one or more valves may include at least one normally closed solenoid valve. The one or more valves may be positioned to vent the one or more volumes to a fan duct.

Another aspect of the invention involves a gas turbine engine having means for supporting shroud segments for movement between associated inboard and outboard positions and including one or more springs biasing the shroud segments toward their inboard positions. One or more valves are positioned to vent one or more volumes so as to counter the bias of the one or more springs to shift the shroud segments to their outboard positions.

In various implementations, a control system may be coupled to the one or more valves and programmed to open the one or more valves during a reburst condition. The one or more valves may be positioned to vent the one or more volumes to a fan duct.

Another aspect of the invention involves a gas turbine engine shroud panel. The panel has a body portion having a transversely concave inboard surface. One or more springs are engaged to the body portion and extend outboard therefrom.

In various implementations, a number of circumferentially arrayed vanes may each have an airfoil extending from the shroud body portion inboard surface. The one or more springs may include a sheet metal spring abutting the body portion.

Another aspect of the invention involves a method for operating a gas turbine engine. The impending loss of blade tip clearance condition is determined. Responsive to the determination, one or more volumes are vented so as to counter the bias of the one or more springs to outwardly shift a number of shroud segments to maintain blade tip clearance.

In various implementations, the venting may comprise venting to a fan duct. The determination may comprise monitoring a throttle condition so as to determine a reburst condition.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
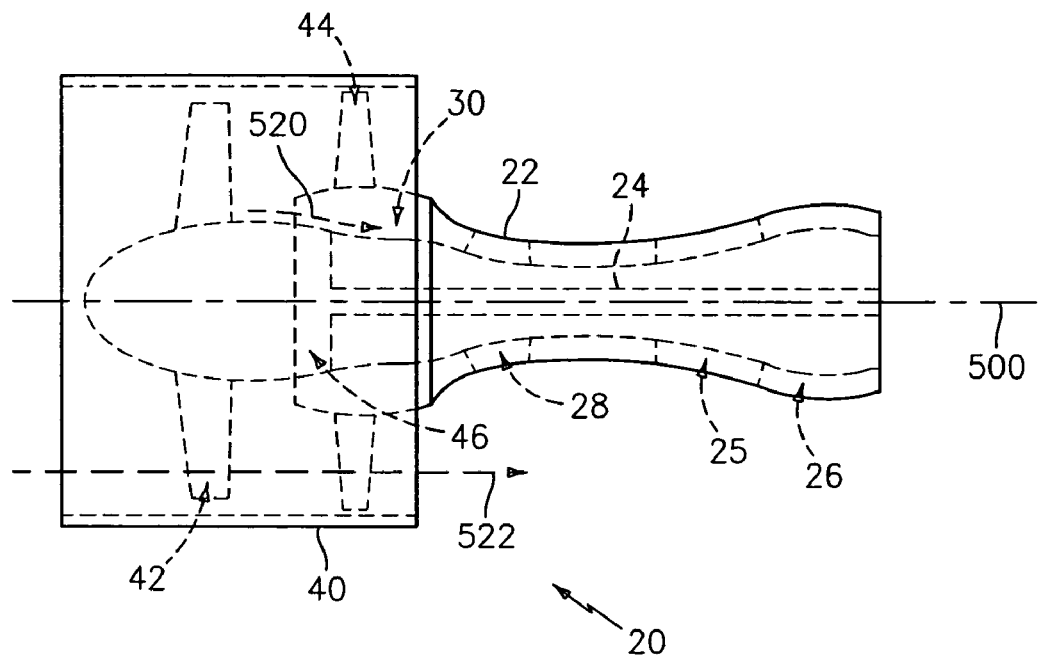
FIG. 1 is a side view of a gas turbine engine.

FIG. 1 shows an exemplary engine 20. For purposes of illustration, the exemplary engine is shown as a geared turbofan engine having a main housing 22 containing a rotor shaft assembly 24. Via high and low shaft portions of the shaft assembly 24, high and low turbine sections 25 and 26 drive high and low compressor sections 28 and 30. The engine extends along a longitudinal axis 500 from a fore end to an aft end. Adjacent the fore end, a shroud 40 encircles a fan 42 and is supported by vanes 44. The low shaft portion of the rotor shaft assembly 24 drives the fan 42 through a reduction transmission 46. An exemplary reduction transmission is a planetary gear system. Nevertheless, the teachings herein may be applied to other engines.

Figure 2:
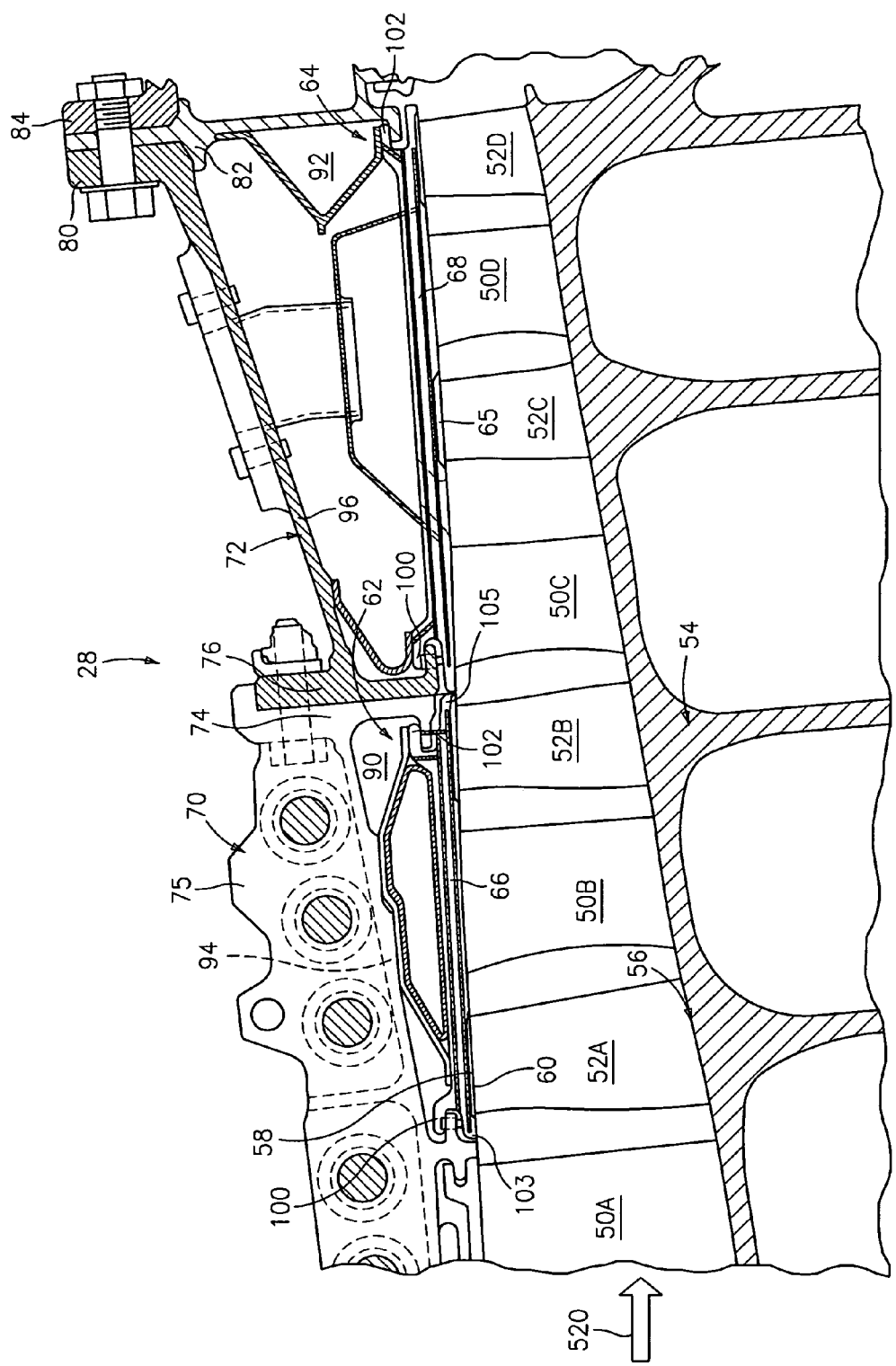
FIG. 2 is a partial longitudinal sectional view of a high pressure compressor section of the engine of FIG. 1.

FIG. 2 shows further details of the exemplary high pressure compressor (HPC) section 28. The HPC 28 includes a number of stages of circumferentially arrayed stationary vanes 50A-50D and rotating blades 52A-52D. The blades may be mounted to or unitarily formed with a rotor disk stack 54 and have airfoil sections extending from a proximal root area 56 to a distal tip 58. The tips of each stage of blades may be in close facing proximity to an inboard surface 60 of an associated shroud 62 and 64 (e.g., locally-formed by a rub strip 65) separated therefrom by a tip clearance described below. Although the vanes 50A-50D appear to be contiguous with the rotor disk stack 54, there may be a radial vane tip clearance or other clearance effective to allow relative rotational motion. In the exemplary embodiment, the shrouds 62 and 64 are circumferentially segmented (into segments 66 and 68) and respectively held by an axially split forward case 70 and a full-ring aft case 72 joined at their respective aft and fore bolting flanges 74 and 76. Each section of the exemplary forward case 70 includes a pair of longitudinal bolting flanges 75 for mounting to the other section. In the exemplary embodiment, the aft case 72 is mounted via its aft bolting flange 80 to an end mount ring 82 and a forward flange 84 of a combustor section ring case.

Figure 3:
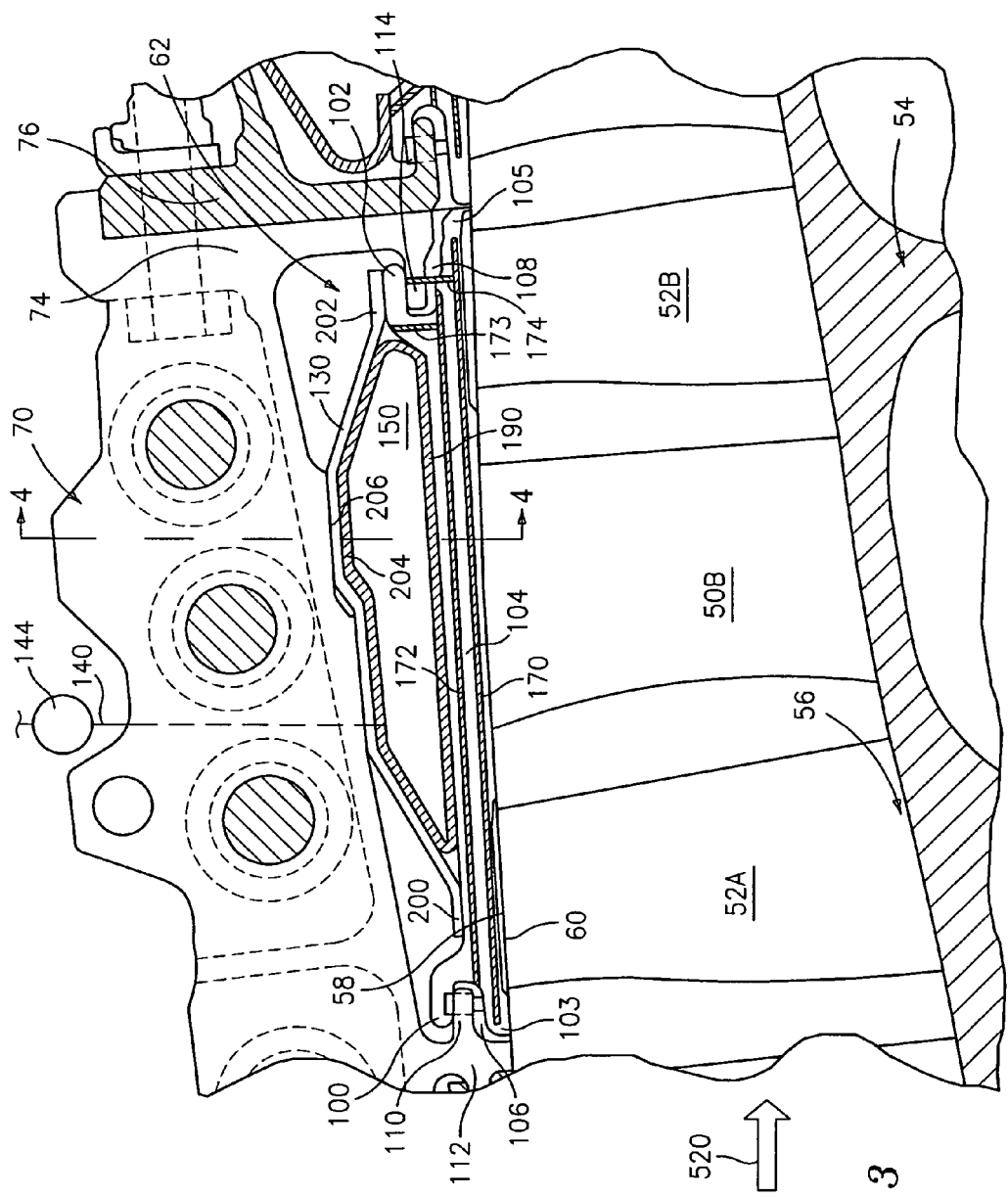
FIG. 3 is a partial longitudinal sectional view of a front case area of the engine of FIG. 1.
Figure 5:
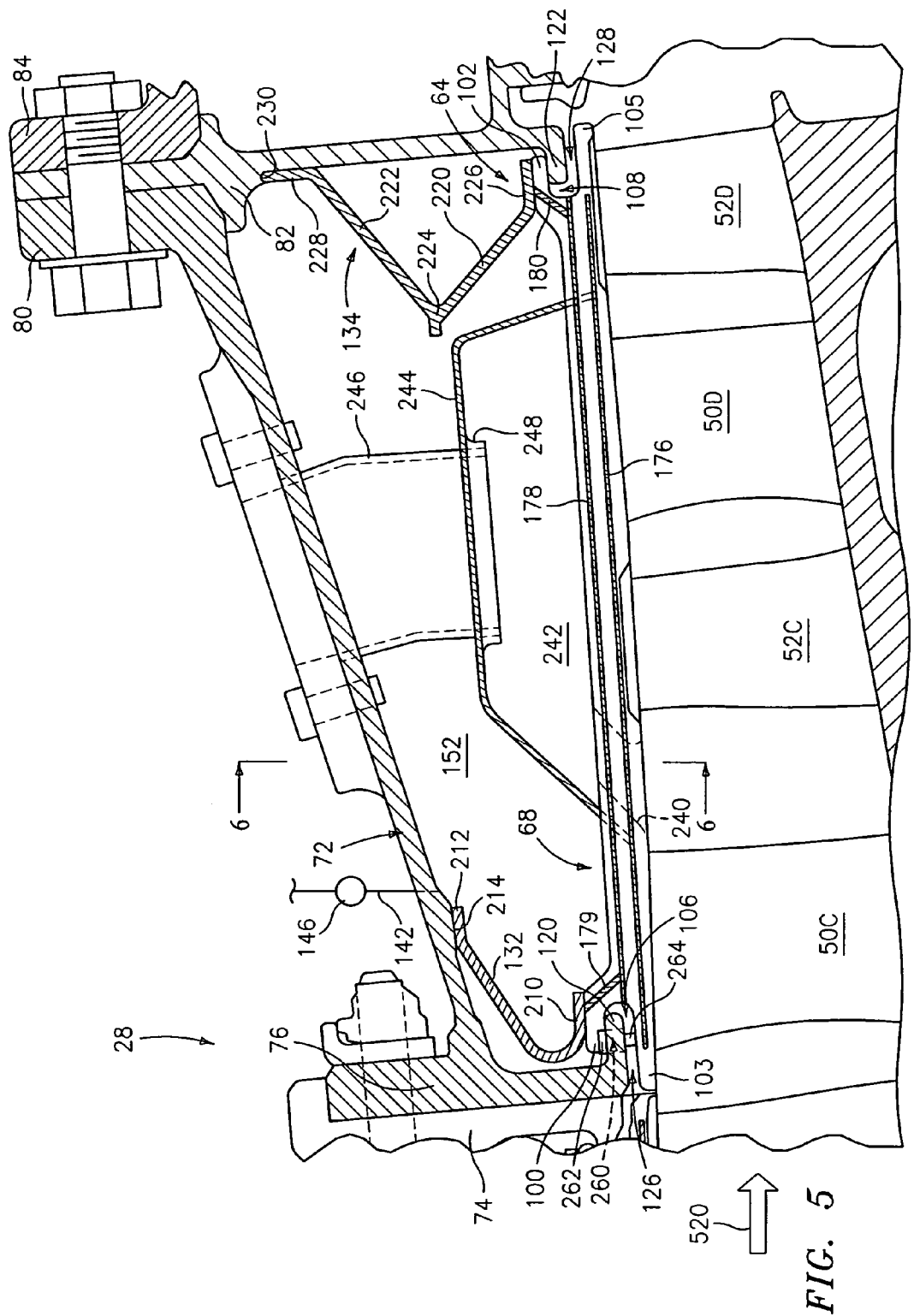
FIG. 5 is a partial longitudinal sectional view of an aft case area of the engine of FIG. 1.

In the exemplary engine, the forward case 70 and aft case 72 bound annular chambers 90 and 92, respectively, inboard of their circumferential walls 94 and 96. Each of the shroud segments has fore and aft circumferential lips 100 and 102 (FIG. 3) outboard of a main body portion 104 of the segment and separated from an adjacent rim portion 103 and 105 of the panel by a channel 106 and 108. The channel accommodates a corresponding annular lip of the stationary case. In the exemplary embodiment, a lip 110 (FIG. 3) extends aft from intermediate flange 112 of the forward case 70 to be received within the forward channel 106 of the segments 66 of the forward shroud 62. A lip 114, extending aft from an inboard portion of the bolting flange 74, is accommodated within the aft channel 108 of the segments 66. A lip 120 (FIG. 5) extends aft from an inboard portion of the bolting flange 76 and is accommodated in the forward channel 106 of the segments 68. A lip 122 extends forward from an inboard portion of the end mount ring 82 to be accommodated within the aft channel 108 of the segments 68. FIGS. 2, 3, and 5, show the shroud segments in an inboard (e.g., an inboardmost) position wherein the inboard surfaces (or undersides) of the segment lips 100; and 102 contact the outboard surfaces of the mating case structure lips leaving gaps 126 and 128 between inboard surfaces of the case lips and outboard surfaces of the associated rim portions 103 and 105 of the segment main bodies. The segments are biased inboard toward such inboard positions. Exemplary bias is achieved by means of springs 130 (FIG. 3), 132 (FIG. 5) and 134 (FIG. 5).

Figure 6:
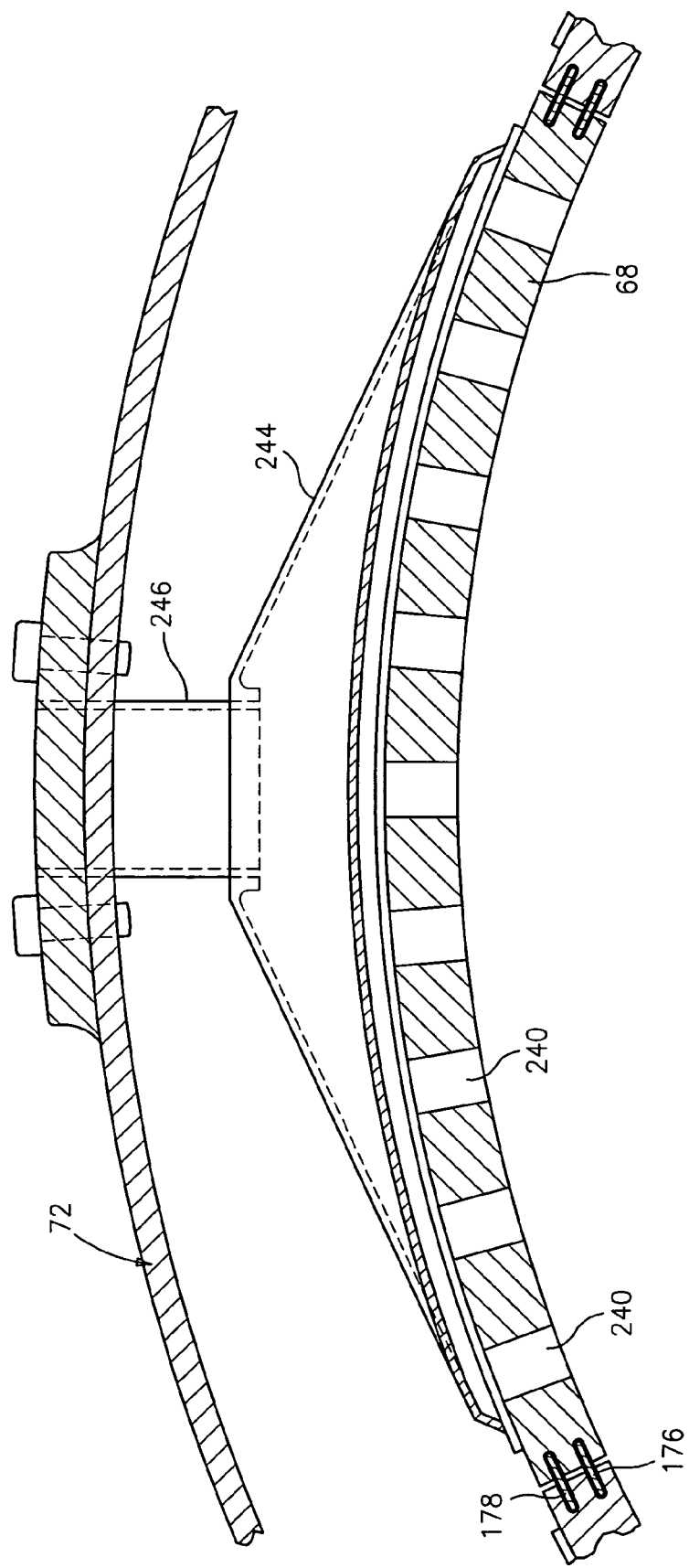
FIG. 6 is a partial transverse sectional view of the aft case area of FIG. 5.
Figure 7:
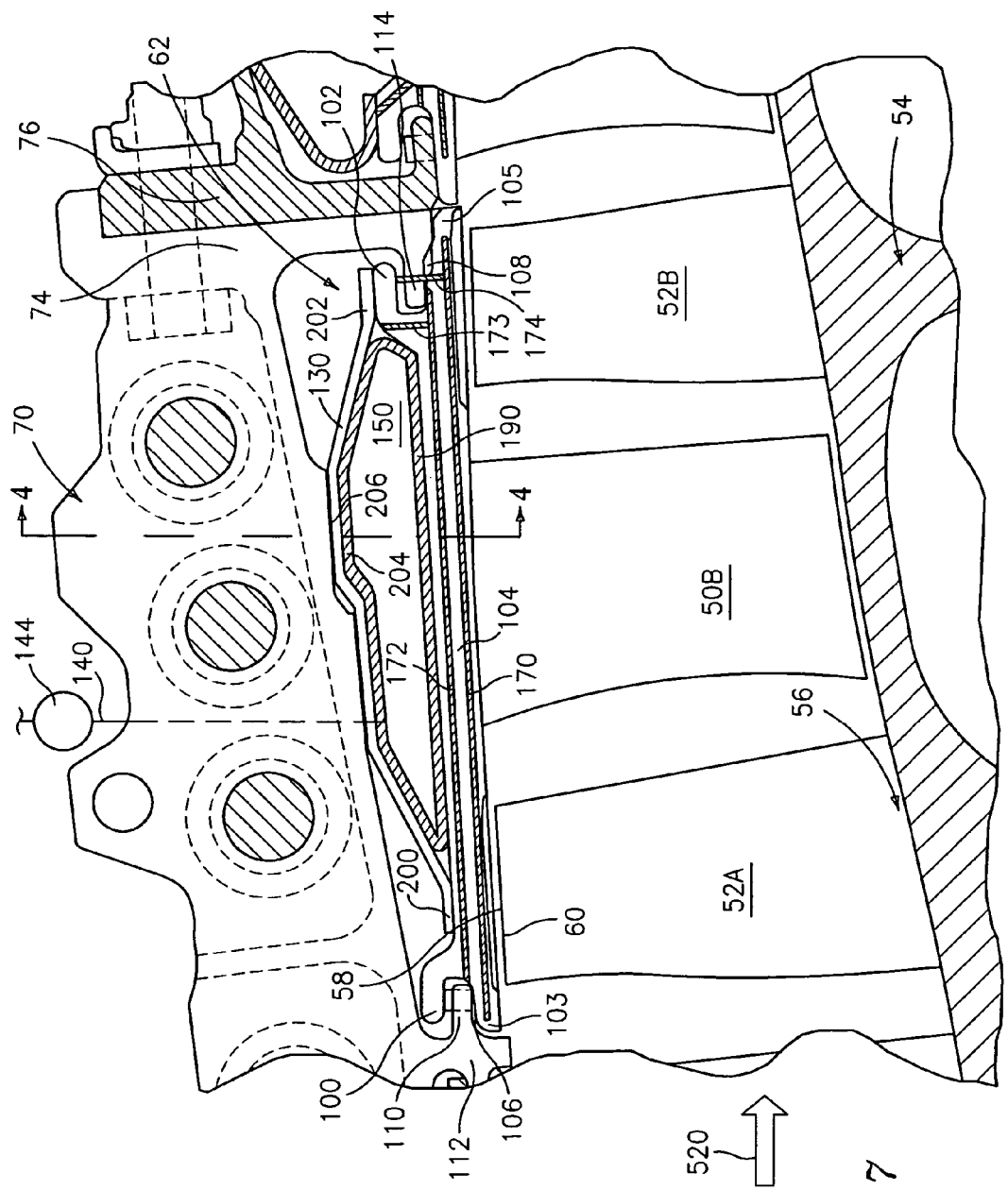
FIG. 7 is a partial longitudinal sectional view of the front case area of FIG. 3 in a shifted condition.

The chambers 90 and 92 are coupled to conduits 140 and 142 (FIGS. 3 and 5, respectively) carrying valves 144 and 146. The conduits may extend from a proximal port at the associated chamber 90 or 92 to a distal port in the outer case or main housing 22 (FIG. 1) within the fan duct 40 (e.g., in the vicinity of the vanes 44). In the exemplary embodiment, the conduits 140 and 142 extend to subportions 150 and 152 of the chambers 90 and 92 generally between the shroud segments and their associated spring(s). Under typical operating conditions, the pressure along the core flowpath 520 within the compressor exceeds the pressure along the bypass flowpath 522 near the distal ends of the conduits 140 and 142. Due to leakage, there will be a tendency for the pressure within the chambers 90 and 92 and their subchambers 150 and 152 to equalize relative to the adjacent pressure in the core flowpath 520 absent further intervention. However, if there is a sufficient pressure difference across the conduits 140 and 142 and the conduits 140 and 142 have sufficient capacity, the opening of the valves 144 and 146 may be effective to maintain a pressure difference radially across the shroud segments. Given leakage, this may involve maintaining the chamber portions 150 and 152 at lower pressures than remaining portions of the chambers 90 and 92 which are at yet lower pressures than adjacent portions of the core flowpath 520. The pressure differences may be effective to overcome the spring bias and radially shift the segments outward, closing the gaps 126 and 128 so that the exterior surfaces of the segment rim portions contact inboard surfaces of the associated lips 110, 114, 120, and 122 (FIGS. 6 and 7). This shift opens gaps between the lips 100 and 102 of the segments and the adjacent lips 110, 114, 120, and 122 of the case structure. The shift also increases the tip clearance between blade tips and associated inboard surfaces 60 of the shroud segments. An exemplary shift is in excess of 250 µm (e.g., 300-500 µm or about 400 µm). In the exemplary embodiment, the shift produces a similar of the vane tip clearance (relative to the rotor stack).

Figure 4:
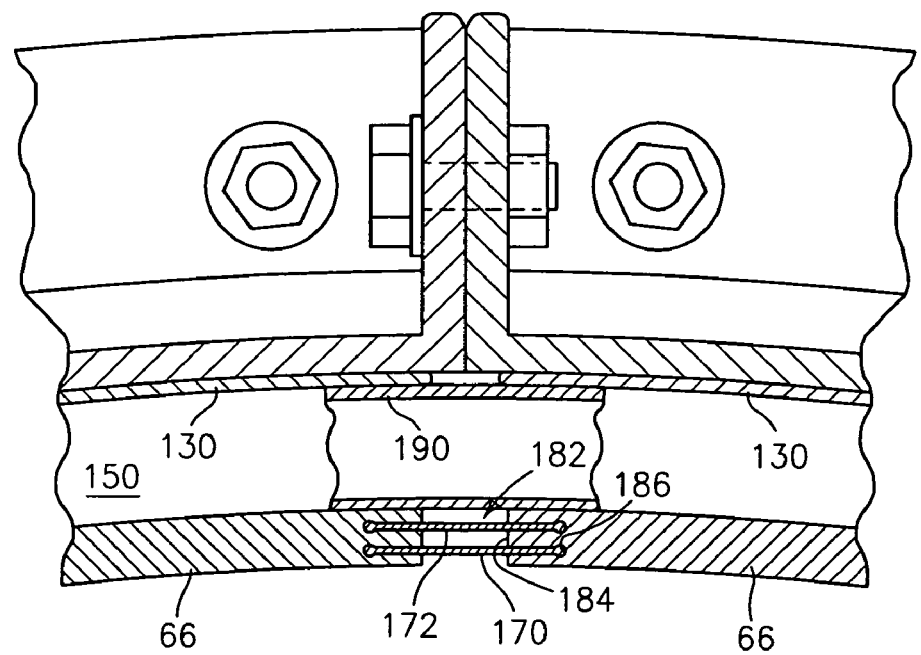
FIG. 4 is a partial transverse sectional view of the front case of FIG. 3.

Advantageously, to facilitate the pressure differential across the shrouds and/or promote efficiency, one or more forms of sealing may be provided between adjacent shroud segments and/or between the shroud segments and adjacent case portions. In an exemplary embodiment, multiple feather seals 170, 172, 173 and 174 (FIG. 3) and 176, 178, 179 and 180 (FIG. 5) may span gaps between adjacent segments. FIG. 4 shows the seals 170 and 172 spanning a gap 182 between adjacent circumferential edges 184 of segments 66. Peripheral portions of each of the seals are captured within associated slots 186 in the edges 184 and have complementary enlarged terminal areas to positively retain the seals. Additionally, a sealing sleeve 190 may span junctions between adjacent springs 130 and their associated shroud segment bodies to seal the subchamber portion 150. In the exemplary embodiment, each spring 130 (FIG. 3) is formed in two 180° circumferential segments meeting along the forward case parting plane. The spring 130 has fore and aft terminal rim portions 200 and 202 having inboard surfaces abutting against outboard surfaces of the segments 66. In the exemplary embodiment, the spring 130 is bent so as to form a bridging structure defining the chamber subportion 150. Intermediate outboard surface portions 204 are dimensioned and shaped to engage complementary surface portions 206 of the wall 94. Resilient compression of the spring 130, tending to radially compress the chamber 150 provides the inward bias and permits the shifting between inboard and outboard positions.

For the aft segments 68, the springs 132 and 134 are alternatively formed. The forward spring 132 is generally a rearwardly open C-shape with inboard and outboard terminal portions 210 and 212 respectively engaging outboard surface portions of the associated segment(s) 68 and an inboard surface portion 214 of the associated wall 96. The exemplary aft spring 134 is a sharper zigzag shape having inboard and outboard legs 220 and 222 meeting at and extending aft from an intermediate vertex region 224. Inboard and outboard terminal portions 226 and 228 respectively engage an outboard surface of the segment and a stepped shoulder 230 in the end mount ring 82. FIG. 5 further shows the illustrated segment 68 as having a bleed port 240 feeding into a bleed plenum 242 surrounded by a wall 244 within the chamber portion 152. An outlet duct 246 extends through the wall 96 and has a distal portion received in sliding engagement with a collar portion 248 of the wall 244. FIG. 6 shows one wall 244 secured to each panel segment 68. For purposes of illustrating position, the FIGS. 2 and 5 showing of the wall 244 and associated hardware is projected into the plane of the drawing although it will actually be beneath the plane at an angle thereto. This is done to show both the segment edge in elevation and the duct 246 which are angularly offset from each other. The sliding engagement accommodates the shift between segment inboard and outboard positions.

Figure 8:
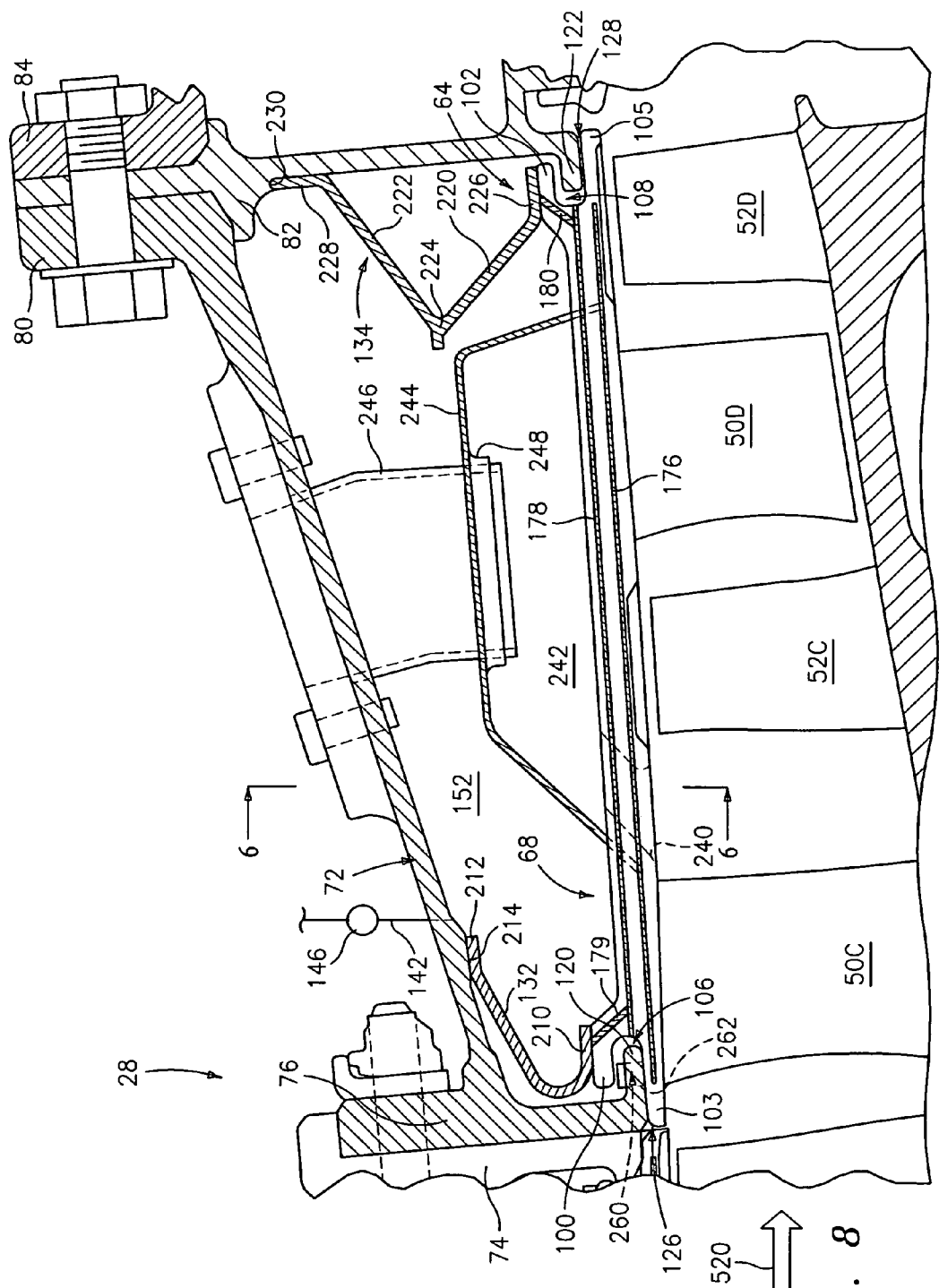
FIG. 8 is a partial longitudinal sectional view of the aft case area of FIG. 5 in a shifted condition.

Means may be provided for monitoring shroud segment condition and controlling such condition in response to other measured or calculated parameters. FIGS. 5 and 8 show a switch 260 having a body 262 mounted in the lip 120 and a plunger 264 protruding radially inward therefrom to engage the outboard surface of the rim portion 103 of the segment 68. Each such segment may have one or more such switches or there may be a lesser number of switches. The outboard shift of the segment from its inboard position to its outboard position depresses the plunger 264 to change the state of the switch 260. Various other sensing arrangements may, alternatively, be used. The switch output may be connected to a control system connected to the valves 144 and 146 to control operation of those valves and, thereby, the shroud segment position. The control system may also be coupled to additional sensors to receive raw or processed sensor input indicating one or more conditions of operation of the engine or the system (e.g., aircraft) in which it is installed so as to control shroud position responsive to such condition(s).

Figure 9:
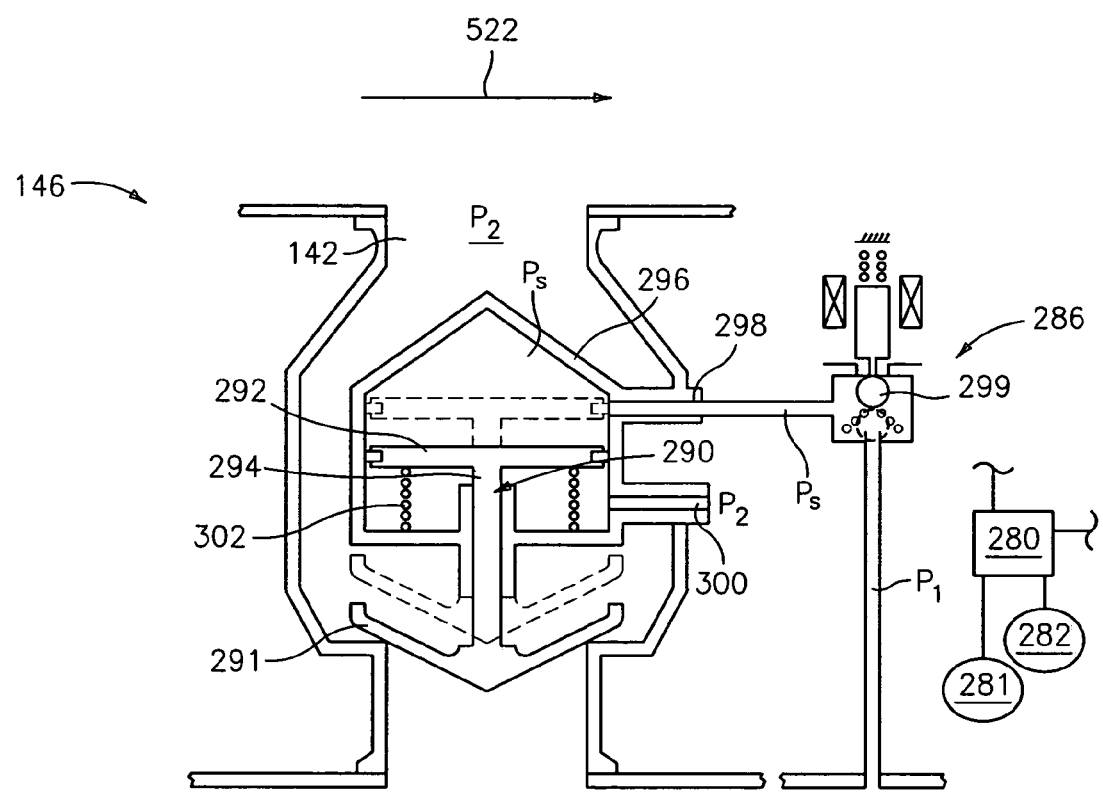
FIG. 9 is a schematic view of a valve used in the engine of FIG. 1.

FIG. 9 shows an exemplary control system 280 coupled to the switches 260 and to sensor inputs 281 and 282 and, in turn, to a solenoid pilot valve 286 of the valve 146 (the valve 144 similarly connected). A main valve element 290 has a first head portion or subelement 291 respective positions shown in solid and broken lines for permitting and blocking flow through the conduit 142. The valve head 291 is, in turn, coupled to a second piston portion or subelement 292 via a shaft 294 to form a differential piston arrangement. Upstream of the head 291 (e.g., toward the case) the conduit is at a first pressure $P_1$ downstream (e.g., toward the duct) the pressure is $P_2$. The piston 292 is located within a chamber 296 within the conduit 142. The chamber 296 is at the distal end of a conduit 298 in which the pilot solenoid valve 286 is located. In the exemplary embodiment, the conduit 298 connects with the chamber 296 on a first side of the piston 292 where the pressure is designated $P_S$. At the second side of the second element 292, the chamber 296 is coupled to bypass air at the bypass duct pressure $P_2$ via a conduit 300. With the pilot valve 286 energized, the conduit 298 is exposed to bleed air at pressure $P_1$ and thus $P_S$ equals $P_1$. In view of factors including the force from a spring 302 and the difference in cross-sectional area of the piston 292 compared with the upstream surface of the head 291, the valve element 290 is in a position closing the conduit 142. Deenergizing the pilot valve 286 shifts its element 299 against spring bias to a broken line position exposing the conduit to the bypass duct pressure $P_2$. Thus $P_S$ is equal to $P_2$. By thus reducing the pressure $P_S$, the force from the spring 302 on the valve element 290 will shift it to its broken line position opening the conduit 142 and, thereby, lowering the pressure in the associated chamber portion 150 or 152. This lowering of pressure induces the outboard shift of the associated shroud segments.

Figure 10:
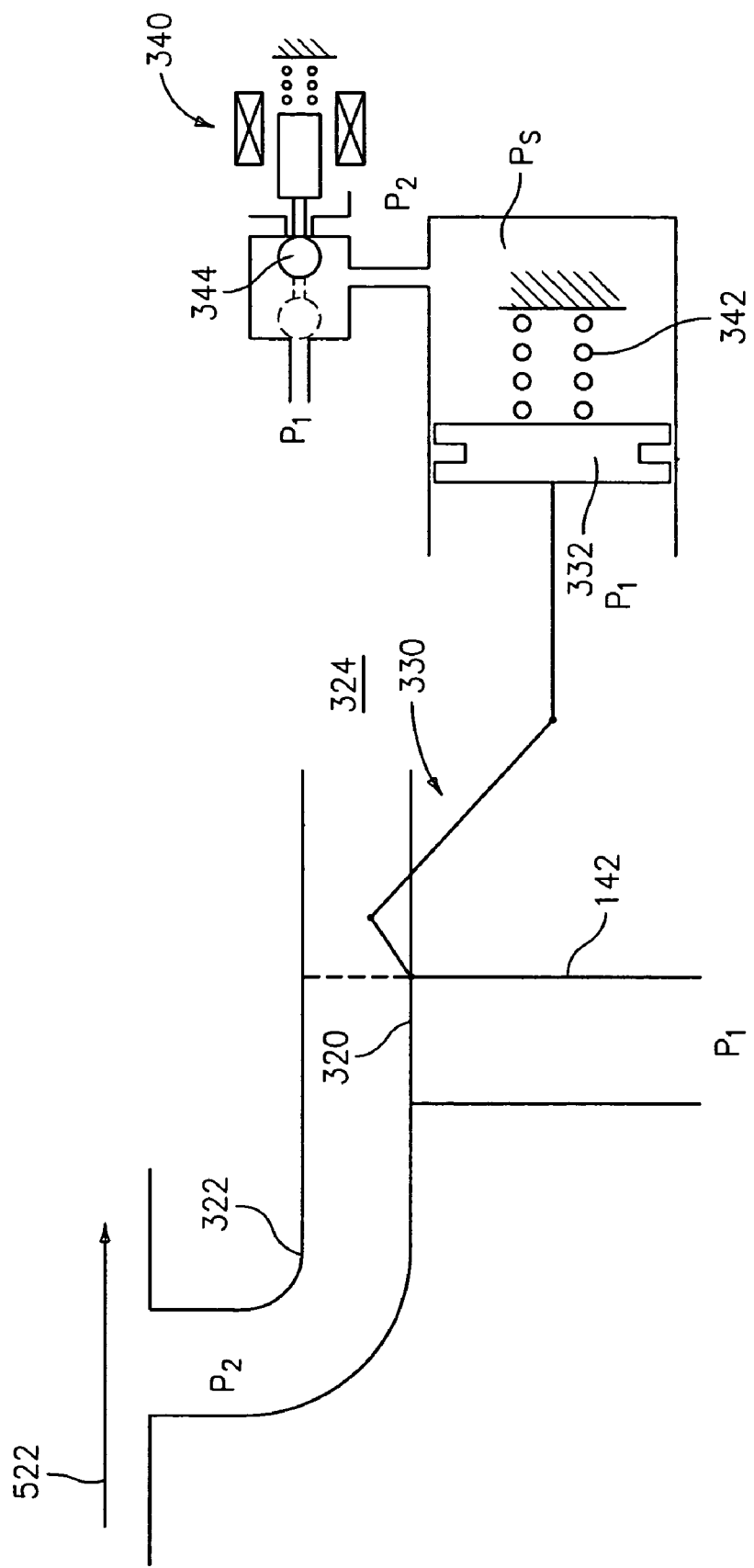
FIG. 10 is a schematic view of an alternate valve used in the engine of FIG. 1.

FIG. 10 shows an alternative implementation of a valve in which a valve element 320 is hingedly mounted in a conduit 322 extending from the duct to the turbine case cooling air manifold (not shown). Such conduits are known for turbine cooling. In the exemplary embodiment, however, the conduit 142 forms a branch whose communication with the conduit 322 is governed by the element 320. The element 320 is movable between a first position (solid line) blocking communication between the conduits 142 and 322 and a second position (broken line) permitting said communication and blocking communication between the duct and turbine cooling air manifold 324. Actuation of the valve is via a linkage 330 coupled to a piston 332. A first side of the piston 332 is at bleed pressure $P_1$. A second side of the piston 332 is at a pressure $P_S$ which may be switched by a pilot solenoid valve 340 between $P_1$ and $P_2$. The pressure in the second side may be augmented via force from a spring 342. In the illustrated embodiment, the element 344 and the pilot valve 340 are shown in solid lines for an energized condition and broken lines for a non-energized condition. In an exemplary implementation, operation of the valve element 320 increases both the high pressure compressor tip clearance and the low pressure turbine tip clearance. The former is achieved by the shroud segment shift. The latter is achieved by partially or fully blocking the cooling air flow through the conduit 322 to the turbine cooling air manifold.

In operation, various conditions may cause differential expansion of components and, thereby, different advantageous shroud conditions. Among these conditions are engine operating conditions (e.g., rapid engine acceleration (and, in particular, rapid reacceleration or reburst)) and aircraft flight conditions (e.g., high-g maneuvering). The engine acceleration tends to have an axisymmetric expansion effect upon tip position whereas maneuvering has a non-axisymmetric effect. The control system 280 which may be a portion of or linked to an engine-specific control system or a central aircraft control system may have a software or hardware algorithm that determines the conditions under which the valve(s) are actuated to outwardly shift the case segments. These may be based upon inputs including engine speed, temperature, time at a given condition, stored condition time history, and the like, For example, reburst may be detected via a throttle time history that shows a decrease from high power shortly followed by a sudden increase. High-g conditions may be detected by accelerometers or by the control inputs that would implement such conditions. The control system may act based upon a combined severity of the g-loading and the engine acceleration (e.g., especially for a non-reburst acceleration).

Whereas active thermal systems may have response times well in excess of 30 seconds, advantageously, the pneumatic shift may be effected much quicker (e.g., under 5 seconds, preferably 2.0 or less, or even 1.0 or less). The relatively fast shifting of the shroud segments afforded by the pneumatic means may sufficiently exceed the performance of purely thermal expansion systems to entirely or largely prevent blade tip impact. Nevertheless, the pneumatic system may be operated additively with a thermal system (e.g., especially a passive thermal system) for advantageous performance across a wide range of operating conditions). A lack of impact may be verified by use of a tip clearance monitoring device such as a capacitance probe. Such a device or probe may also provide input to the control system.

The pneumatic system may be implemented in a reengineering or remanufacturing of an existing engine configuration or engine. In such a situation, the pneumatic system may replace an existing active thermal system or may augment an existing passive thermal system. In one exemplary situation, a baseline configuration or engine has a passive thermal system but no active thermal system. The baseline configuration/engine is configured to have an initial static tip clearance (measured post run-in). The passive thermal system provides a degree of expansion beyond this initial clearance. In the reengineered configuration/engine, the presence of the pneumatic system permits the static clearance to be reduced (e.g., by the amount of the pneumatic shift or at least a major portion thereof). The passive thermal system may be preserved or replaced with a generally similar system providing at least a major portion of the baseline passive thermal expansion. Reducing the static tip clearance permits one or more of a number of performance changes. The reengineered configuration/engine may be more efficient and/or have more power than the baseline configuration/engine thanks to the reduced clearance.

One or more embodiments of the present invention have been described. Nevertheless, it will be understood that various modifications may be made without departing from the spirit and scope of the invention. For example, when implemented in a reengineering of an existing engine, details of the existing engine may influence or dictate details of any particular implementation. Accordingly, other embodiments are within the scope of the following claims.

What is claimed is:

1. A turbine engine comprising:
a case structure;
a circumferentially segmented shroud within the case structure and comprising a plurality of segments, each segment having an inboard surface portion and mounted for movement between an inboard position and an outboard position;
a stage of circumferentially arrayed blades, each blade having an airfoil having an outboard tip in facing proximity to the shroud;
one or more springs biasing the shroud segments toward their inboard positions; and one or more valves positioned to vent one or more volumes so as to counter the bias of the one or more springs to shift the shroud segments to their outboard positions, the one or more volumes enclosed by the one or more springs and the shroud segments wherein the one or more springs contact the shroud at an upstream end and a downstream end.

2. The engine of claim 1 wherein:
a radial displacement between the inboard position and the outboard position is at least 250 μm.

3. The engine of claim 1 wherein:
deenergizing at least one of the one or more valves shifts the shroud segments to their outboard positions.

4. The engine of claim 1 further comprising:
a stage of circumferentially arrayed vanes, each vane having an airfoil having an outboard portion secured to an associated one of the segments.

5. The engine of claim 1 further comprising:
a bleed port in at least one of the shroud segments, the bleed port extending from a core flowpath surrounded by the shroud;
an outlet duct extending inward from the case structure; and
a collar portion of said at least one of the shroud segments receiving a distal portion of the outlet duct in sliding engagement.

6. The engine of claim 1 further comprising:
a plurality of seals, each seal between an associated pair of the segments.

7. The engine of claim 1 wherein:
each of a group of the plurality of segments has at least an associated first spring of the one or more springs engaged to an outboard surface portion of the segment.

8. The engine of claim 7 wherein:
for each of said group, the first spring consists essentially of sheet metal.

9. The engine of claim 7 wherein:
for a given ring of the segments, an associated group of the one or more springs at least partially enclose an associated volume of the one or more volumes.

10. The engine of claim 1 further comprising:
a control system coupled to the one or more valves and programmed to open the one or more valves during a reburst condition.

11. The engine of claim 1 wherein:
the one or more valves include at least one normally closed solenoid valve.

12. The engine of claim 1 wherein:
the one or more valves are positioned to vent the one or volumes to a fan duct.

13. A turbine engine comprising:
a case structure;
a circumferentially segmented shroud within the case structure and comprising a plurality of segments, each segment having an inboard surface portion and mounted for movement between an inboard position and an outboard position;
a stage of circumferentially arrayed blades, each blade having an airfoil having an outboard tip in facing proximity to the shroud;
a first spring contacting the shroud at an upstream end and a second spring contacting the shroud at a downstream end, the first and second springs biasing the shroud segments toward their inboard positions; and one or more valves positioned to vent one or more volumes so as to counter the bias of the first and second springs to shift the shroud segments to their outboard positions.

14. The engine of claim 13 further comprising:
a control system coupled to the one or more valves and programmed to open the one or more valves during a reburst condition.

15. The engine of claim 13 wherein:
the one or more valves are positioned to vent the one or volumes to a fan duct.

16. A method for operating a gas turbine engine of claim 1, the method comprising:
determining an impending condition characterized by a loss of blade tip clearance of the blades of the stage; and
responsive to the determination, venting the one or more volumes so as to counter a bias of the one or more springs to outwardly shift the segments to maintain the blade tip clearance.

17. The method of claim 16 wherein:
the shift further maintains a vane tip clearance.

18. The method of claim 16 wherein:
the shift is accomplished in 2.0 seconds or less and has a radial amplitude of at least 250 μm.

19. The method of claim 16 wherein:
the venting comprises venting to a fan duct.

20. The method of claim 16 wherein:
the determining comprises monitoring throttle condition so as to identify a reburst situation.

21. The system of claim 1 further comprising:
sealing members sealing between adjacent said springs.

22. The engine of claim 21 wherein:

the sealing members are sleeves spanning junctions between adjacent said springs and bodies of the associated said shroud segments to seal a subchamber, said subchamber being one of said volumes.

23. The engine of claim 1 wherein:

each segment has an associated bleed port feeding from a core flowpath surrounded by the shroud into a bleed plenum surrounded by a wall within one of the volumes, the one or more valves positioned to vent said one of the volumes.

24. The engine of claim 1 wherein:

the one or more springs include a fore portion abutting an outboard surface of the associated segment and an aft portion abutting the outboard surface of the associated segment.

25. The engine of claim 24 wherein:

the fore portion and aft portion are of a single piece bridging the volume.

26. The engine of claim 13 further comprising:

a plurality of seals, each seal between an associated pair of the segments.

27. The engine of claim 13 wherein:

each said segment has a single associated first spring and a single associated said second spring.

28. The engine of claim 13 wherein:

each said first spring and second spring consist essentially of sheet metal.

\* \* \* \* \*

UNITED STATES PATENT AND TRADEMARK OFFICE
CERTIFICATE OF CORRECTION

PATENT NO. : 7,596,954 B2
APPLICATION NO. : 10/887587
DATED : October 6, 2009
INVENTOR(S) : Penda et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 652 days.

Signed and Sealed this

Twenty-eighth Day of September, 2010

David J. Kappos
*Director of the United States Patent and Trademark Office*